United States Patent

[11] 3,602,220

[72] Inventor John Bunyan
 22 Seymour St. Portman Square, London, England
[21] Appl. No. 854,053
[22] Filed Aug. 29, 1969
[45] Patented Aug. 31, 1971

[54] SURGICAL DRESSINGS INCLUDING BANDAGE AND THE LIKE
 10 Claims, 5 Drawing Figs.
[52] U.S. Cl. .................................................. 128/156
[51] Int. Cl. .................................................. A61f 13/00
[50] Field of Search ........................................ 128/155, 156

[56] References Cited
UNITED STATES PATENTS
3,073,303  1/1963  Schaar .......................... 128/156
FOREIGN PATENTS
876,086  8/1961  Great Britain ................. 128/156

Primary Examiner—Robert W. Michell
Assistant Examiner—L. Anten
Attorney—Baldwin, Wight & Brown ABSTRACT: An outer covering for the absorbent material of a surgical dressing is formed of a sheet or layer of flexible plastic material having therein openings, for the passage of exudation, in the form of hollow open-ended tunnellike portions upstanding from one face of the sheet. The interiors of these portions communicate with both faces of the sheet and may be arranged in spaced parallel rows.

Inventor:
John Bunyan
BY Baldwin, Wight, Viller & Brown, Attorneys

SURGICAL DRESSINGS INCLUDING BANDAGE AND THE LIKE

BACKGROUND OF THE INVENTION

This invention relates to improvements in and relating to surgical dressings, bandages and the like.

In the past, surgical dressings have generally comprised a pad or wad of absorbent material, such as cotton wool, enclosed in an outer covering of cotton gauze, or like woven material, which is applied to an open wound for the purpose of absorbing exudation from the wound and keeping it clean. Such dressings have the disadvantage that the cotton gauze threads, which become saturated with exudation, tend to adhere to the flesh of the patient and cause considerable discomfort when the dressing is removed from the wound.

More recently use has been made of a sheet or layer of thermoplastic material, such, for example, as polythene, in place of cotton gauze, as it was found that such material, owing to its homogeneous nature, did not adhere to the skin.

As will be readily appreciated, the use of thermoplastic material necessitates, in order to allow for drainage of the exudation from a wound, the provision of openings in the otherwise imperforate sheet.

Openings of various shapes and sizes, including circular holes or perforations and narrow elongated slits, have been proposed, but, while dressings, formed of a plastic material perforated in this manner, offer the advantage of less discomfort to the patient when removed, they have not proved entirely satisfactory in providing truly effective and adequate drainage of exudate from the wound, which is necessary for rapid healing of the wound.

I have investigated this problem and have found that the disadvantages referred to above can be readily overcome in a simple manner.

FIELD OF THE INVENTION

The principal object of the invention is to provide an improved surgical dressing, or an outer covering therefor, which can be readily removed from a patient's skin without causing discomfort and at the same time allow of adequate drainage of the wound.

Another object of the invention is to provide an improved surgical dressing of the kind comprising a layer of absorbent material arranged between layers of perforated plastic material, which, while permitting the passage of exudation from a wound to the absorbent material, will not become adherent to the skin tissues of the patient and can be readily removed therefrom.

A further object of the invention is to provide an improved plastic outer covering for the absorbent material of a surgical dressing, which does not suffer from the deficiencies of plastic coverings as heretofore used or proposed.

SUMMARY OF THE INVENTION

The invention thus broadly contemplates the provision of an outer covering for the absorbent material of a surgical dressing as hereinafter defined, which comprises a sheetlike layer of flexible plastic material, as hereinafter defined, in which openings are provided for the passage therethrough of exudation from a wound, the said openings being formed of hollow, open-ended, tunnellike portions upstanding from one face of the plastic sheet or layer, the interior of each of the said portions being in communication with both faces of said sheet or layer.

In practice, the outer covering preferably comprises parts thereof adapted to enclose said dressing on opposite sides thereof, at least one of which parts is formed with openings in accordance with the invention.

In applying the invention to a surgical dressing comprising a wad or sheet of absorbent material, the outer covering is arranged on opposite sides of said wad or sheet, at least that portion thereof intended for application to a wound having openings therein in accordance with the invention.

In carrying out the invention in practice, the upstanding tunnellike portions may be arranged in spaced parallel relation so as to extend throughout the area of the plastic sheet or layer. Preferably, however, a plurality of spaced rows of such tunnellike portions is provided, each row itself comprising a single tunnellike portion or a plurality of evenly spaced tunnellike portions or a plurality of sets of single or multiple tunnellike portions, which advantageously extend in a direction transversely to the longitudinal axis of the pertaining row. For example, each row of openings may comprise a plurality of sets of three upstanding tunnellike portions, which portions are themselves interconnected.

In this case the tunnellike portions in one row may be arranged directly in line with those in the next adjacent row or rows or may be staggered relative thereto.

BRIEF DESCRIPTION OF THE DRAWINGS

The invention will be more readily understood from the following description taken in conjunction with the accompanying diagrammatic drawings, which illustrate some preferred embodiments of the invention, it being clearly understood that the invention is in no way limited thereto or thereby, but that the true scope of the invention is defined in and by the appended claims.

In the drawings.

DESCRIPTION OF PREFERRED EMBODIMENTS

Figure 1:
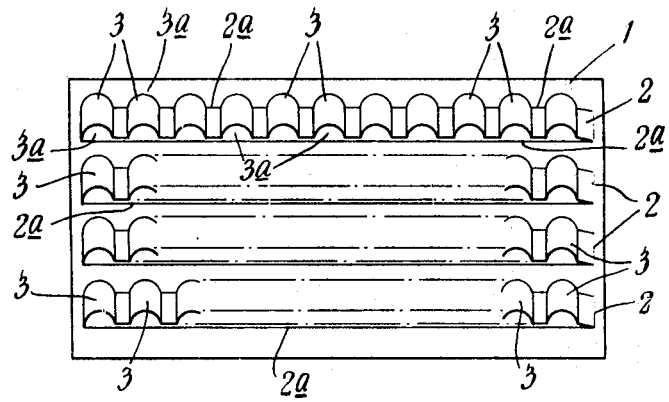
FIG. 1 is a view of part of an outer covering for a surgical dressing, embodying one form of the invention.

Referring to the drawing and first to FIG. 1 thereof, 1 represents a sheet or layer of flexible plastic material constituting part of an outer covering for a surgical dressing and intended for application to a wound. This layer 1 is formed with a number of spaced rows 2 of upstanding hollow tunnellike portions 3. The portions 3 of each row 2, which extend throughout the length of the layer 1, are, as shown, arranged transversely of the longitudinal axis of the pertaining row 2, and are interconnected. Each tunnel portion 3 is open at both ends thereof as shown at 3a and the interior thereof is in communication with both faces of the plastic sheet or layer 1.

The aforesaid rows 2 of tunnellike portions 3 may be formed in the sheet or layer 1 in any suitable manner, but advantageously each row 2 is made by cutting or slitting the sheet 1 along two adjacent parallel lines 2a and simultaneously or subsequently expanding the material of the sheet 1, located between the two slits 2a in a suitable moulding tool, to form the upstanding tunnellike portions.

Figure 2:
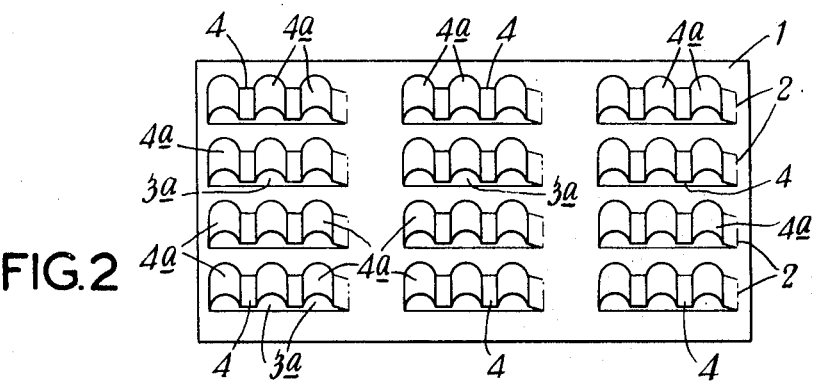
FIG. 2 is a similar view to FIG. 1, but showing a modified construction.

In the modified construction shown in FIG. 2, each row 2, instead of being composed of a continuous series of interconnected tunnellike portions 3, is formed of a series of spaced sets 4 of such portions, each composed of three interconnected and intercommunicating tunnellike portions 4a. As shown in FIG. 2, the spaced sets 4 of any one row 2 are arranged directly in line with those in the next adjacent row 2.

Figure 3:
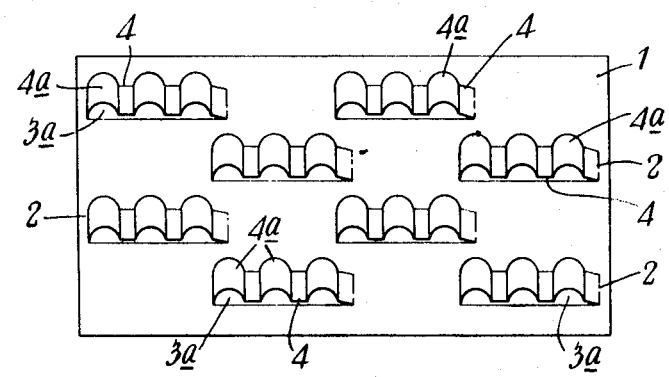
FIG. 3 is a similar view showing a further modification.

In the modification shown in FIG. 3, the construction is similar to that shown in FIG. 2 except that, in this case, the sets 4 of three tunnellike portions 4a in any one row 2 are arranged in staggered relation with respect to those in the next adjacent row 2.

Figure 4:
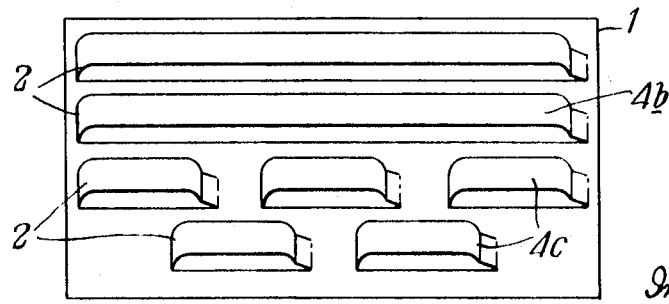

In the further modification shown in FIG. 4, each row 2, instead of being composed of a continuous series, or a series of spaced sets, of tunnellike portions 3, comprises a single tunnellike portion 4b or a series of spaced single tunnellike portions 4c arranged similarly to the spaced set arrangement shown in FIG. 2 or 3.

Figure 5:
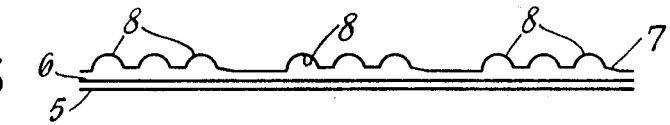
FIG. 4 is a similar view showing a still further modification and FIG. 5 is a sectional view of a surgical dressing having an outer covering made in accordance with the invention.

FIG. 5 shows in section a surgical dressing comprising a wad or sheet member 6 of absorbent material, such as cotton wool, having thereover an outer covering of plastic material consisting of an outer sheetlike layer portion 5 and an under, generally planar, sheetlike layer portion 7, intended for application to a wound, the portion 7 being provided with sets of hollow, open-ended outwardly projecting upstanding tunnellike portions 8 constructed as described in connection with FIG. 2 or 3 above and corresponding to the spaced sets 4 of tunnellike portions 4a of these figures. The tunnellike portions 8 extend in a direction away from the sheetlike layer portion 5, and the longitudinal axes of the portions 8 lie in the general plane of the sheetlike layer portion 7.

In the use of the above surgical dressing, the latter is applied to a wound with the layer or sheet 7 in contact therewith and retained in position in any known and normal manner. It will be found that, while the tunnellike portions 8 are sufficient to allow the free passage of exudation from the sound to the absorbent material 6 of the dressing, there will be no tendency for the dressing to adhere to the tissues of the patient's skin and it can, therefore, be readily removed without discomfort to the patient.

As will be readily appreciated, there is provided by means of the invention a surgical dressing, which meets the requirements of a satisfactory dressing, as it will be found to be nonadherent, to be capable of being formed to any shape without affecting this property and to provide adequate absorption: the dressing may, moreover, be made in any suitable or convenient shape or size.

It is to be understood that, by the expression "plastic material" as used herein, is meant an organic water-insoluble material, whether thermoplastic or thermosetting, which is capable of being formed into a thin flexible sheet or film.

It is further to be understood that the term "surgical dressing" as used herein and in the claims is intended to have the meaning generally assigned to it in the art of medicine and surgery and includes bandages, such as form part of first aid equipment and also bedsheets carrying absorbent material on which a patient is placed.

What I claim is:

1. A covering for the absorbent material of a nonadherent surgical dressing, which comprises sheetlike layer portions of flexible plastic material adapted to enclose said absorbent material on opposite sides thereof, at least that sheetlike layer portion intended to be applied to a wound being generally planar and having therein a plurality of openings for the passage therethrough of exudation from a wound, said openings comprising hollow open-ended tunnellike portions upstanding and projecting outwardly from the face of said sheetlike layer portion intended to be applied to a wound and thus in a direction away from the other of said sheetlike layer portions, and the longitudinal axes of said tunnellike portions lying in the plane of said sheetlike layer portion intended to be applied to a wound.

2. A covering according to claim 1 in which the upstanding tunnellike portions are arranged in spaced parallel relation so as to extend throughout the area of said sheetlike layer portions.

3. A covering according to claim 1 in which a plurality of spaced rows of tunnellike portions, each row itself comprising a single tunnellike portion, are provided.

4. A covering according to claim 1, in which a plurality of spaced rows of tunnellike portions, each row itself comprising a plurality of evenly spaced tunnellike portions, are provided.

5. A covering according to claim 1 in which a plurality of spaced rows of tunnellike portions, each row itself comprising a plurality of spaced sets of single tunnellike portions, are provided.

6. A covering according to claim 1 in which a plurality of spaced rows of tunnellike portions, each row itself comprising a plurality of spaced sets of multiple tunnellike portions, which are themselves interconnected, are provided.

7. A covering according to claim 1 in which there are a plurality of spaced rows of said hollow open-ended tunnellike portions, each row itself comprising a plurality of evenly spaced tunnellike portions extending in a direction transverse to the longitudinal axis of the said row.

8. A covering according to claim 1 in which there are a plurality of spaced rows of hollow open-ended tunnellike portions, the tunnellike portions in any one row being arranged directly in line with those in the next adjacent row.

9. A covering according to claim 1 in which there are a plurality of spaced rows of hollow open-ended tunnellike portions, the tunnellike portions in any one row being arranged in staggered relation with respect to those in the next adjacent row.

10. A surgical dressing which comprises a member of absorbent material and, on opposite sides of said member, a sheetlike layer portion of flexible plastic material, at least that sheetlike layer portion intended for application to a wound being generally planar and having therein a plurality of openings for the passage of exudation from a wound, said openings comprising hollow open-ended tunnellike portions upstanding and projecting outwardly from the face of said sheetlike layer portion intended to be applied to a wound and remote from said member, and the longitudinal axes of said tunnellike portions lying in the plane of the sheetlike layer intended to be applied to a wound, whereby to permit free passage of exudation from the wound to said member while preventing direct mutual contact of skin tissue and said member.